United States Patent
Golla et al.

(10) Patent No.: US 12,182,016 B1
(45) Date of Patent: Dec. 31, 2024

(54) MEMORY CIRCUIT WITH POWER REGISTERS

(71) Applicant: Cadence Design Systems, Inc., San Jose, CA (US)

(72) Inventors: Robert Golla, Austin, TX (US); Matthew Smittle, Allen, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 149 days.

(21) Appl. No.: 17/981,666

(22) Filed: Nov. 7, 2022

Related U.S. Application Data

(60) Provisional application No. 63/264,291, filed on Nov. 18, 2021.

(51) Int. Cl.
   *G06F 12/0802* (2016.01)

(52) U.S. Cl.
   CPC .. *G06F 12/0802* (2013.01); *G06F 2212/1028* (2013.01); *G06F 2212/221* (2013.01)

(58) Field of Classification Search
   CPC ......... G06F 12/0802; G06F 2212/1028; G06F 2212/221
   See application file for complete search history.

(56) References Cited

U.S. PATENT DOCUMENTS

| | | | | |
|---|---|---|---|---|
| 5,568,442 A * | 10/1996 | Kowalczyk | ........... | G06F 9/3814 |
| | | | | 712/E9.055 |
| 6,288,923 B1* | 9/2001 | Sakamoto | ........... | G06F 12/0893 |
| | | | | 711/3 |
| 2006/0282621 A1* | 12/2006 | Moyer | ................. | G06F 9/3802 |
| | | | | 711/E12.018 |
| 2010/0049953 A1* | 2/2010 | Mylavarapu | ........ | G06F 12/0882 |
| | | | | 712/225 |
| 2012/0182795 A1* | 7/2012 | Estakhri | ............. | G11C 11/1675 |
| | | | | 365/171 |
| 2015/0026408 A1* | 1/2015 | Lee | ..................... | G06F 12/0891 |
| | | | | 711/133 |
| 2016/0299700 A1* | 10/2016 | Day | .................... | G06F 12/0842 |
| 2022/0035739 A1* | 2/2022 | Ballapuram | .......... | G06F 3/0655 |

* cited by examiner

*Primary Examiner* — Michael Krofcheck
(74) *Attorney, Agent, or Firm* — Mark H. Whittenberger; Holland & Knight LLP

(57) ABSTRACT

A memory circuit may include both an array circuit and multiple register circuits, where the power to retrieve data from one of the register circuits may be less than the power to retrieve data from the array circuit. The array circuit may store multiple data words, and the multiple register circuits may be configured to store a subset of the multiple data words. During a first cycle, a read command and an address may be received. In response to a determination that the address corresponds to a given data word included in the subset of the multiple data words, the array circuit may be de-activated in a second cycle subsequent to the first cycle and an output signal may be generated by selecting data retrieved from a particular register circuit of the multiple register circuits in which the given data word may be stored.

15 Claims, 11 Drawing Sheets

MEMORY CIRCUIT WITH POWER REGISTERS

CROSS REFERENCE TO RELATED APPLICATIONS

This application claims the benefit of U.S. Provisional Patent Application having Ser. No. 63/264,291, filed 18 Nov. 2021, the entire content of which is incorporated herein by reference.

FIELD OF THE INVENTION

Embodiments of the present disclosure relate to data storage in a computer system, and, in particular, to power reduction in memory circuits.

BACKGROUND

Computer systems include multiple processors or processor cores that may retrieve and execute program instructions from memory. The program instructions may be part of software programs or applications, and may be designed to perform particular functions, such as word processing, sending and receiving electronic mail, and the like. During execution of such a software program, instructions included in the software program may send data to, or receive data from, one or more devices included in, or coupled to, the computer system. Such data may also be stored and later retrieved from a memory circuit included in the computer system.

To facilitate the retrieval of program instructions, and the storage of data, computer systems may include multiple memory circuits. Such memory circuits may vary in storage capacity as well as in access time. In some computer systems, memory circuits may be arranged in a hierarchical fashion, with smaller, faster memory circuits (referred to as "cache memories") coupled directly to processor circuits or processor cores. Larger, slower memory circuits (referred to as "main memory") are coupled to the processor circuits or processor cores via a memory management unit and a communication network.

Cache memories may store frequently used program instructions and data, so that a processor may quickly retrieve frequently used program instructions and data without having to wait for an access to main memory. Accesses to main memory can take multiple processing cycles, which can cause a processor circuit or processor core to wait for requested data, resulting in a decrease in performance.

SUMMARY

The present disclosure describes a technique for reducing power in a memory circuit. In embodiments, an apparatus may include a storage circuit that may include both an array circuit and a plurality of register circuits. The array circuit may be configured to store a plurality of data words, and the plurality of register circuits may be configured to store a subset of the plurality of data words. A control circuit may be configured to receive, during a first cycle, a read command and an address. In response to a determination that the address corresponds to a given data word included in the subset of the plurality of data words, the control circuit may be further configured to de-activate the array circuit in a second cycle subsequent to the first cycle. A selection circuit may be configured to generate an output signal by selecting data retrieved from a particular register circuit of the plurality of register circuits in which the given data word may be stored.

One or more of the following feature may be included. The control circuit may be further configured to receive, during a third cycle, a second read command and a second address. The control circuit may also be configured to, in response to a determination that the second address does not correspond to any data words included in the subset of the plurality of data words, retrieve, during a fourth cycle subsequent to the third cycle, a particular data word corresponding to the second address from the array circuit. The control circuit may additionally be configured to store, during the fourth cycle, the particular data word in a given register circuit of the plurality of register circuits. Further, the control circuit may be configured to generate, during the fourth cycle, a second output signal using the particular data word retrieved from the array circuit.

To store, during the fourth cycle, the particular data word in a given register circuit, the control circuit may be further configured to select, using a write pointer, the given register circuit of the plurality of register circuits, wherein the given register circuit includes a plurality of storage circuits, store the particular data word in a first portion of the register circuit, store the second address in a second portion of the register circuit, store a valid value into a third position of the particular register circuit, and update a value of the write pointer.

The control circuit may be further configured to receive a write command, a second address, and write data during a third cycle. The control circuit may also be configured to in response to a determination that the address corresponds to a previously stored data word included in the subset of the plurality of data word. The control circuit may additionally be configured to invalidate, in a fourth cycle subsequent to the third cycle, the previously stored data word in the plurality of register circuits. Further, the control circuit may be configured to store, during the fourth cycle, the write data in the array circuit.

To de-activate the array circuit in the second cycle, the control circuit may be further configured to halt a clock signal used by the array circuit. The control circuit may also be configured to compare the first address to a plurality of addresses associated with the subset of the plurality of data words stored in corresponding ones of the plurality of register circuits. The control circuit may additionally be configured to in response to a determination that the first address matches a particular address of the plurality of addresses, select a particular register circuit of the plurality of register circuits that stores the particular address.

In embodiments, a method may include receiving, by a memory circuit during a first cycle, a read command and an address, wherein the memory circuit includes a first storage circuit configured to store a plurality of data words, and a second storage circuit configured to store a subset of the plurality of data words, and wherein a first power consumption associated with retrieving a previously stored data word from the first storage circuit is greater than a second power consumption associated with retrieving the previously stored data from the second storage circuit. The method may further include, in response to determining that the address included in the read command corresponds to a given data word included in the subset of the plurality of data words de-activating the first storage circuit in a second cycle subsequent to the first cycle, retrieving, during the second cycle, the given data word from the second storage circuit, and generating an output signal using the given data word retrieved from the second storage circuit.

One or more of the following features may be included. The first storage circuit may include a plurality of data storage cells configured to store the plurality of data words. De-activating the first storage circuit in the second cycle may include halting a clock signal used by the first storage circuit. The second storage circuit may include a plurality of register circuits configured to store corresponding ones of the subset of the plurality of data words and associated addresses. The method may further include comparing the address to a plurality of addresses associated with the subset of the plurality of data words stored in the corresponding ones of the plurality of register circuits. The method may also include in response to determining that the address included in read command matches a particular address of the plurality of addresses, selecting a particular register circuit of the plurality of register circuits that stores the particular address.

The method may further include receiving, during a third cycle, a second read command and a second address. The method may also include, in response to determining that the second address does not correspond to any data words included in the subset of the plurality of data words retrieving, during a fourth cycle subsequent to the third cycle, a particular data word corresponding to the second address from the first storage circuit, storing, during the fourth cycle, the particular data word in the second storage circuit, and generating a second output signal using the particular data word retrieved from the first storage circuit.

Storing, during the fourth cycle, the particular data word may include selecting, using a write pointer, a particular register circuit of the plurality of register circuits, storing the particular data word into a portion of the particular register circuit, storing the second address into a second portion of the particular register circuit, storing a valid value into a third portion of the particular register circuit, and updating a value of the write pointer.

The method may further include receiving a write command, a second address, and write data during a third cycle. The method may also include in response to determining that the second address corresponds to a previously stored word included in the subset of the plurality of data words, invalidating, in a fourth cycle subsequent to the third cycle, the previously stored data word in the second storage circuit, and storing, during the fourth cycle, the write data in the first storage circuit.

In embodiments, an apparatus may include a processor circuit. The apparatus may further include a cache memory circuit that includes a first storage circuit configured to store a plurality of data words, and a second storage circuit configured to store a subset of the plurality of data words, wherein a first power consumption associated with retrieving a previously stored data word from the first storage circuit may be greater than a second power consumption associated with retrieving the previously stored data from the second storage circuit. The cache memory circuit may be configured to receive, from the processor circuit during a first cycle, a first read command and a first address. The cache memory circuit may be further configured to, in response to a determination that the first address corresponds to a given data word included in the subset of the plurality of data words de-activate the first storage circuit in a second cycle subsequent to the first cycle, retrieve, during the second cycle, the given data word from the second storage circuit, and generate an output signal using the given data word retrieved from the second storage circuit.

The first storage circuit may include a plurality of data storage cells configured to store the plurality of data words. To de-activate the first storage circuit in the second cycle, the cache memory circuit may be further configured to halt a clock signal used by the first storage circuit. The second storage circuit may include a plurality of register circuits configured to store corresponding ones of the subset of the plurality of data words and associated addresses. The cache memory circuit may be further configured to compare the first address to a plurality of addresses associated with the subset of the plurality of data words stored in the corresponding ones of the plurality of register circuits, and in response to a determination that the first address matches a particular address of the plurality of addresses, select a particular register circuit of the plurality of register circuits that stores the particular address.

The cache memory circuit may also be configured to receive, during a third cycle, a second read command and a second address. The cache memory circuit may additionally be configured to in response to a determination that the second address does not correspond to any data words included in the subset of the plurality of data words, retrieve, during a fourth cycle subsequent to the third cycle, a particular data word corresponding to the second address from the first storage circuit, store, during the fourth cycle, the particular data word m the second storage circuit, and generate a second output signal using the particular data word retrieved from the first storage circuit.

To store the particular data word, the cache memory circuit may be further configured to select, using a write pointer, a particular register circuit of the plurality of register circuits, store the particular data word into a portion of the particular register circuit, store the second address into a second portion of the particular register circuit, store a valid value into a third portion of the particular register circuit, and update a value of the write pointer.

The cache memory circuit may also be configured to receive a write command, a second address, and write data during a third cycle. The cache memory circuit may additionally be configured to in response to a determination that the address corresponds to a previously stored word included in the subset of the plurality of data words invalidate, in a fourth cycle subsequent to the third cycle, the previously stored data word in the second storage circuit, and store, during the fourth cycle, the write data in the first storage circuit.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
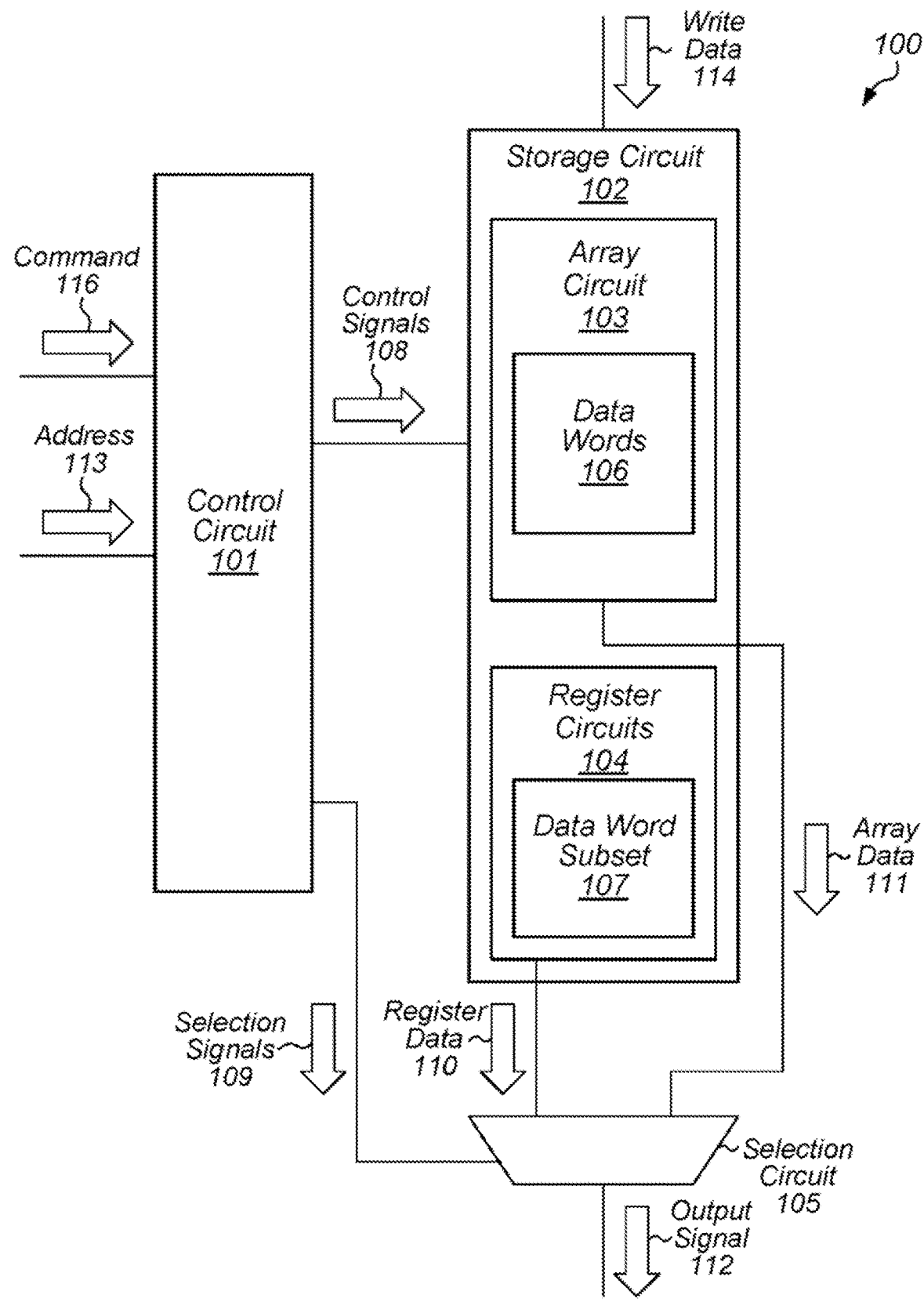
FIG. 1 is a block diagram of an embodiment of a memory circuit.

Computer systems often employ a hierarchy of memory circuits, with smaller-capacity, higher-performing memory circuits located in close proximity to processor circuits. During operation of a computer system, various memory circuits may store a variety of data relating to operands, instructions, graphics, or other audio and visual data.

One particular type of memory circuit employed in a computer system is a cache memory circuit, which may be used to store frequently used program instructions and data for a processor circuit. By storing frequently used program instructions and data, a computer system may avoid delays associated with accesses to main memory or external storage devices, thereby improving performance. Stored information in a cache memory circuit may be organized in "cache lines" that include multiple bits. In some cases, a cache line may store a single program instruction, an operand, or any other suitable type of data.

To provide fast access to stored data, a cache memory circuit may often be implemented with a static random-access memory (SRAM) circuit. Such SRAM circuits may reduce access time by using high-gain amplifier circuits and high-speed digital logic circuits, which may provide the desired performance at the expense of power consumption. Moreover, the charging and discharging of bit lines within the SRAM storage array may also add to the power consumption. In some computer systems, multiple cache memory circuits may be used at various levels of the memory hierarchy, becoming a dominant factor in the power consumption of the computer system.

The embodiments illustrated in the drawings and described below may provide techniques for reducing the power consumption of memory circuits, including cache memory circuits, using a set of register circuits that store copies of data also stored in an array circuit. The power consumption associated with retrieving data from the register circuits may be less than the power consumption associated with retrieving data stored in the array circuit. Upon receiving a read access command, an address included in the command may be compared to the addresses of the data copies stored in the set of register circuits. If the address corresponds to a copy of data stored in the set of register circuits, the array circuit may be de-activated, and the data may be retrieved from the set of register circuits. By not activating the array circuit, the power associated with pre-charging, sensing, and the like, may be eliminated, thereby reducing the overall power consumption of a memory circuit.

Turning now to FIG. 1, a block diagram of a memory circuit is depicted. As illustrated, memory circuit 100 may include control circuit 101, storage circuit 102, and selection circuit 105. In various embodiments, storage circuit 102 may include array circuit 103 and register circuits 104.

Array circuit 103 may be configured to store data words 106. As described below, array circuit 103 may include multiple data storage cells each configured to store a corresponding bit of a data word. A given data word included in data words 106 may include any suitable number of bits. For example, in some embodiments, the given data word included in data words 106 may include 8 bits.

In various embodiments, array circuit 103 may include sufficient data storage cells to store any suitable number of data words. The number of data words included in data words 106 may, in some embodiments, be based on power requirements, specified silicon area limits, performance, and the like.

Register circuits 104 may be configured to store data word subset 107. In various embodiments, data words included in data word subset 107 may also be included in data words 106. The number of data words included in data word subset 107 may be based on desired performance, area, and power dissipation targets. As described below, register circuits 104 may include multiple register circuits each configured to store a corresponding one of data word subset 107.

Control circuit 101 may be configured to receive, during a cycle, command 116 and address 113. In various embodiments, command 116 may be a read command that indicates data corresponding to address 113 is to be retrieved from storage circuit 102. Alternatively, command 116 may be a write command that indicates write data 114 is to be stored at a location within storage circuit 102 that corresponds to address 113. Although command 116 is depicted as being received via a single wire, in other embodiments, command 116 may include multiple bits that are received via corresponding wires. Alternatively, command 116 may be physically split onto two wires, one corresponding to a read command and the other corresponding to a write command. Control circuit 101 may, in some embodiments, be configured to invalidate an entry in register circuits 104 in response to a determination that address 113 matches an address corresponding to one of the data words included in data word subset 107.

During a read cycle, in response to a determination that address 113 corresponds to a given data word included in data word subset 107, control circuit 101 may be configured to deactivate array circuit 103 in a second cycle subsequent to the first cycle. In various embodiments, control circuit 101 may be configured to activate and de-activate various ones of control signals 108 to control the operation of storage circuit 102. As described below, control signals 108 may include a clock signal used by array circuit 103. To determine if address 113 corresponds to the given data word included in data word subset 107, control circuit 101 may be further configured to compare address 113 to addresses associated with data word subset 107. Additionally, control circuit 101 may be further configured to check valid bits associated with the data words included in data word subset 107.

As used herein, when a signal is activated, it may be set to a logic or voltage level that activates a load circuit or device. The logic level may be either a high logic level or a low logic level depending on the load circuit. For example, an active state of a signal coupled to a p-channel MOSFET may be a low logic level (referred to as an "active low signal"), while an active state of a signal coupled to an n-channel MOSFET may be a high logic level (referred to as an "active high signal").

Selection circuit 105 may be configured to generate output signal 112 by selecting register data 110 retrieved from a particular register circuit of register circuits. In various embodiments, selection circuit 105 may be further configured to generate output signal 112 using selection signals 109 generated by control circuit 101. Selection signal 109 may, in some embodiments, specify whether array data 111 or register data 110 is used to generate output signal 112. In cases where register data 110 is to be used, selection signals 109 may further specify which output of register circuits 104 is to be used to generate output signal 112.

In various embodiments, selection circuit 105 may be implemented using multiple logic gates configured to implement a selection function. Alternatively, selection circuit 105 may be implemented using multiple pass-gate circuits coupled together in a wired-OR fashion. It is noted that, in some embodiments, selection circuit 105 may include one or more buffer circuits configured to provide additional drive to output signals 112.

In some cases, data storage cells within array circuit 103 may not be able to store data due to manufacturing defects, damage during operation, and the like. In such cases, particular ones of register circuits 104 may be used as redundant storage. Control circuit 101 may be configured to store addresses corresponding to locations within array circuit 103 that include inoperable data storage cells. In response to a determination that address 113 matches a redundant address, control circuit 101 may be further configured to deactivate array circuit 103 and retrieve data corresponding to address 113 from registers circuits 104.

Figure 2A:
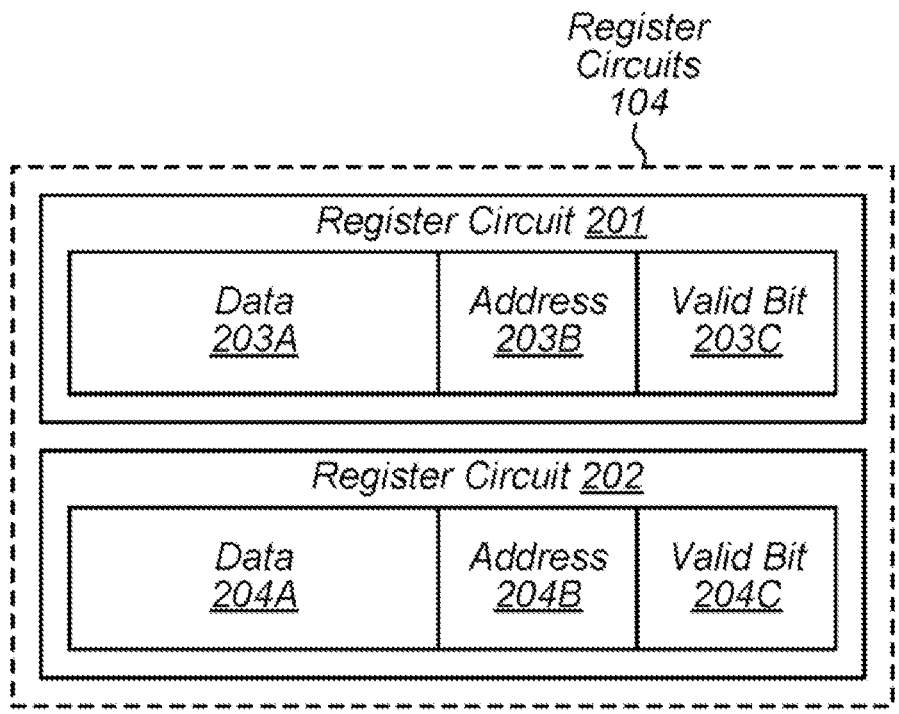
FIG. 2A is a block diagram of an embodiment of register circuits.

Turning to FIG. 2A, a block diagram of an embodiment of register circuits 104 is depicted. As illustrated, register circuits 104 may include register circuits 201 and 202. It is noted that although register circuits 104 is depicted as including two register circuits, in other embodiments, register circuits 104 may include any suitable number of register circuits.

Register circuits 201 may be configured to store data 203A, address 203B, and valid bit 203C. In a similar fashion, register circuit 202 may be configured to store data 204A, address 204B, and valid bit 204C. In various embodiments, data 203A and data 204A may be included in data word subset 107. Address 203B and valid bit 203C may correspond to data 203A, while address 204B and valid bit 204C may correspond to data 204A.

Data 203A and data 204A may, in some embodiments, correspond to cache lines fetched from main memory by a processor or processor core. In some cases, data 203A and data 204A may include data from multiple ways within a cache memory circuit that correspond to a portion of address 203B and address 204B, respectively.

Valid bits 203C and 204C may indicate the validity of data 203A and 204A, respectively. For example, if valid bit 203C is a logical-1, then data 203A may be considered valid and may be used. Alternatively, if valid bit 204C is a logical-0, then data 204A may be considered invalid and register circuit 202 may be available for storage during an allocation operation.

Figure 2B:
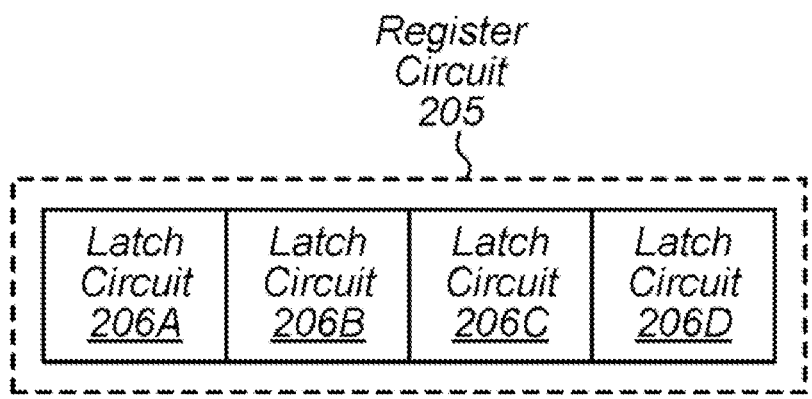
FIG. 2B is a block diagram of an embodiment of a register circuit.

Turning to FIG. 2B a block diagram of a register circuit is depicted. As illustrated, register circuit 205 may be include latch circuits 206A-206D. In various embodiments, register circuit 205 may correspond to either of register circuits 201 or 202 as depicted in FIG. 2A. Although only four latch circuits are depicted as being included in register circuit 205, in various embodiments, register circuit 205 may include any suitable number of latch circuits.

Each of latch circuits 206A-206D are configured to store a single bit of information. Groups of latch circuits may be used to store the different items. For example, one group of latch circuits may be configured to store data 203A, while another group of latch circuits may be used to store address 203B.

Latch circuits 206A-206D may be implemented using any suitable storage circuit. For example, in some embodiments, latch circuits 206A-206D may be implemented using cross-coupled inverter circuits along with pass-gate circuits. It is noted that, in various embodiments, each of latch circuits 206A-206D may include multiple latch circuits coupled together in a primary-secondary fashion.

Figure 3:
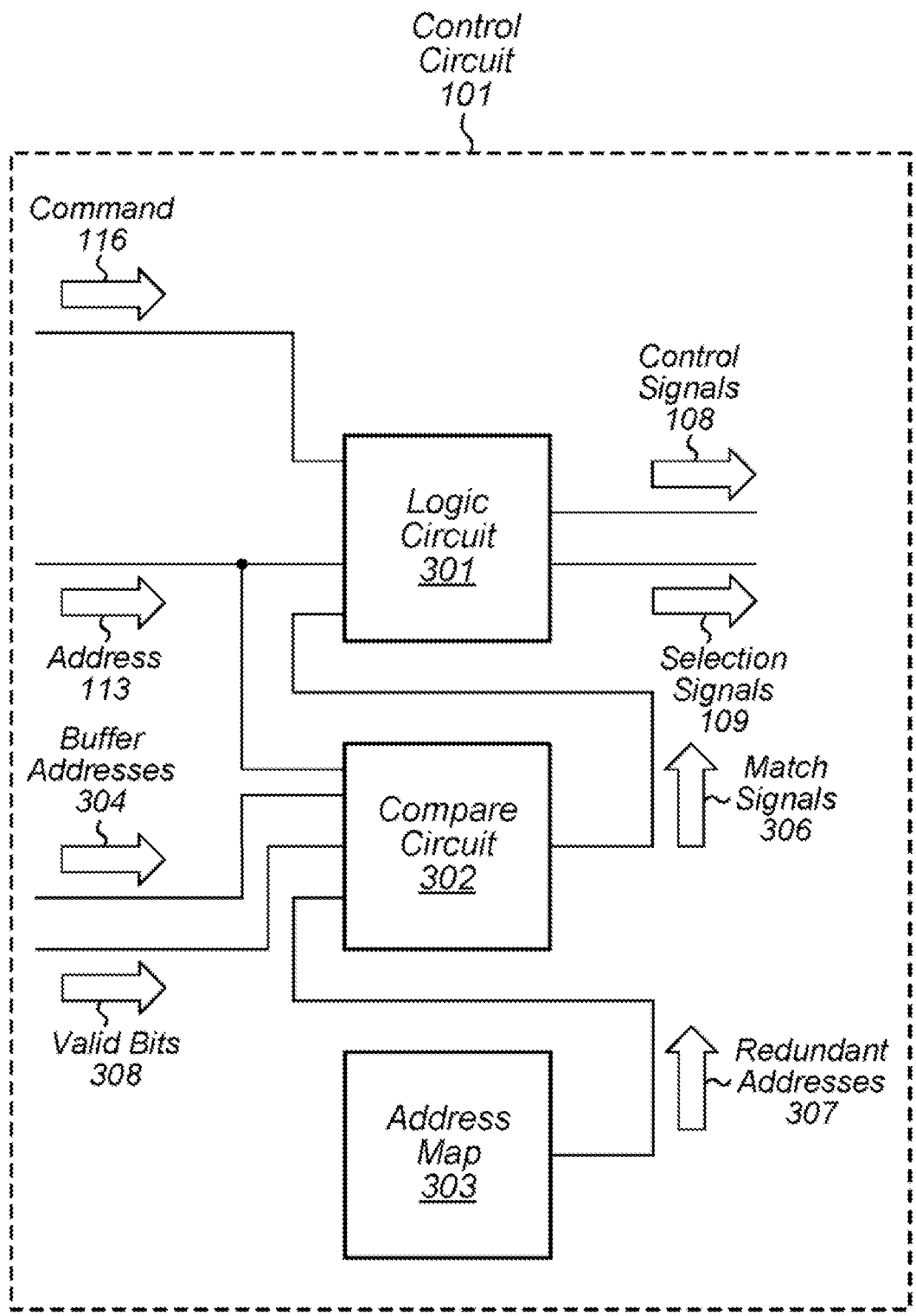
FIG. 3 is a block diagram of an embodiment of a control circuit for a memory circuit.

Turning to FIG. 3, a block diagram of an embodiment of control circuit 101 is depicted. As illustrated, control circuit 101 may include logic circuit 301, compare circuit 302, and address map 303.

Logic circuit 301 may be configured to generate control signals 108 and selection signals 109 using command 116, address 113, and match signals 306. In various embodiments, logic circuit 301 may be configured to activate particular ones of control signals 108 based on the values of command 116, address 113, and match signals 306. For example, in response to a determination that match signals 306 is at a high logic level, logic circuit 301 may deactivate a clock signal included in control signals 108 and activate a particular one of selection signals 109 in order to retrieve desired data from register circuits 104 while deactivating array circuit 103. In various embodiments, logic circuit 301 may be implemented as a state machine or any other suitable combination of sequential and combinatorial logic circuits.

Compare circuit 302 may be configured to generate match signals 306 using address 113 and buffer addresses 304. In some embodiments, compare circuit 302 may be further configured to additionally use valid bits 308 to generate match signals 306. It is noted that buffer addresses 304 may, in some embodiments, be stored in register circuits 104 and may correspond to data words also stored in register circuits 104. In a similar fashion, valid bits 308 may also be stored in registers circuits 104 and may correspond to valid bits 203C and 204C as depicted in FIG. 2. In various embodiments, to generate match signals 306, compare circuit 302 may be configured to compare address 113 to each address included in buffer addresses 304. In response to a determination that address 113 matches a given one of buffer addresses 304, compare circuit 302 may be further configured to activate a particular one of match signals 306.

In some embodiments, compare circuit 302 may also be configured to generate match signal 306 using a result of comparing address 113 to redundant addresses 307. To generate match signal 306 using address 113 and redundant addresses 307, compare circuit 302 may be further configured to perform a bitwise comparison of the addresses included in redundant addresses 307 to address 113. In response to a determination that address 113 matches a given one of redundant addresses 307, compare circuit 302 may activate a particular one of match signals 306. In various embodiments, compare circuit 302 may be implemented using exclusive-OR logic gates, or any other suitable circuit configured to perform a bitwise comparison of address 113 and the addresses included in buffer addresses 304. It is noted that in some embodiments, compare circuit 302 may compare a portion of the address 113 to corresponding portions of buffer addresses 304 and redundant addresses 307 as opposed to comparing all of the bits included in address 113.

Address map 303 may be configured to store redundant addresses 307. In various embodiments, address map 303 may be configured to be programmed during an initialization operation. In some cases, address map 303 may be configured such that redundant addresses 307 can be periodically updated. In various embodiments, address map 303 may be implemented using a one-time programmable memory circuit, or any other suitable non-volatile memory circuit.

Figure 4:
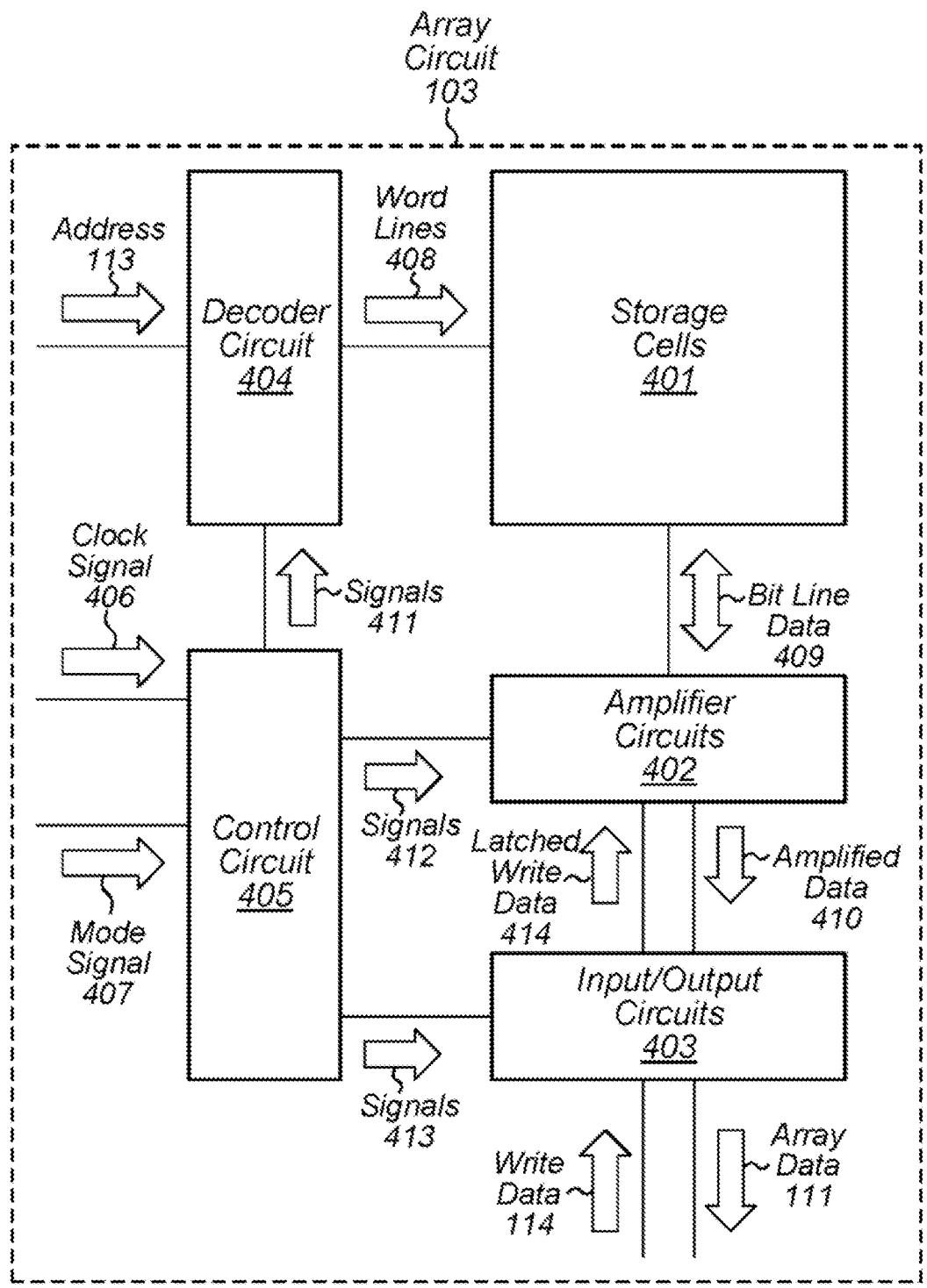
FIG. 4 is a block diagram of an embodiment of a storage array circuit for a memory circuit.

Array circuit 103 make be implemented using various storage circuit topologies. A block diagram of an embodiment of array circuit 103 is depicted in FIG. 4. As illustrated, array circuit 103 may include storage cells 401, amplifier circuits 402, input/output circuits 403, decoder circuit 404, and control circuit 405.

Turning to FIG. 4, storage cells 401 may include multiple data storage cells that may be implemented using a variety of circuit topologies. For example, in some cases, the data storage cells may be implemented as SRAM storage cells, dynamic random-access memory (DRAM) storage cells, non-volatile storage cells, or any other suitable data storage cell circuit topology. The data storage cells included in storage cells 401 may be arranged in an array of rows and columns, with each data storage cell in a row coupled to a common word line of word lines 408 and a corresponding pair of bit lines. In response to a word line being activated, the data storage cells coupled to the word line may output a small voltage or current onto their corresponding bit lines, which may be amplified by amplifier circuits 402. While a particular word line is activated, data storage cells coupled to the particular word line may also be configured to store new data received via the bit lines coupled to the data storage cells.

Amplifier circuits 402 may be configured to amplify, during a read operation, bit line data 409 to generate amplified data 410. Additionally, amplifier circuits 402 may be configured to drive, during a write operation, data onto the bit lines using latched write data 414. In various embodiments, amplifier circuits 402 may be implemented using latching comparator circuits, differential amplifier circuits, or any other suitable amplifier circuit.

Decoder circuit 404 may be configured activate a particular one of word lines 408 using address 113 and signals 411. As described below, signals 411 may be based on a clock signal and provide a timing reference for decoder circuit 404.

Input/Output circuits 403 may be configured to generate array data using amplified data 410 and signals 413. In various embodiments, signals 413 may include timing information as well as mode information specifying whether a read or write operation is being performed. Additionally, input/output circuits 403 may also be configured to receive and latch write data 114 to generate latched write data 414. In various embodiments, input/output circuits 403 may be implemented using multiple latch or flip-flop circuits, as well as multiple inverter circuits configured to drive load circuits (e.g., selection circuit 105) that are configured to receive array data 111.

Control circuit 405 may be configured to generate signals 411, 412, and 413 using clock signal 406 and mode signal 407. In various embodiments, clock signal 406 may be included in control signals 108 as depicted in FIG. 1. In various embodiments, clock signal 406 may be deactivated in order to deactivate array circuit 103. Control circuit 405 may, in some embodiments, be implemented as a state machine or any other suitable combination of sequential and combinatorial logic circuits.

Figure 5:
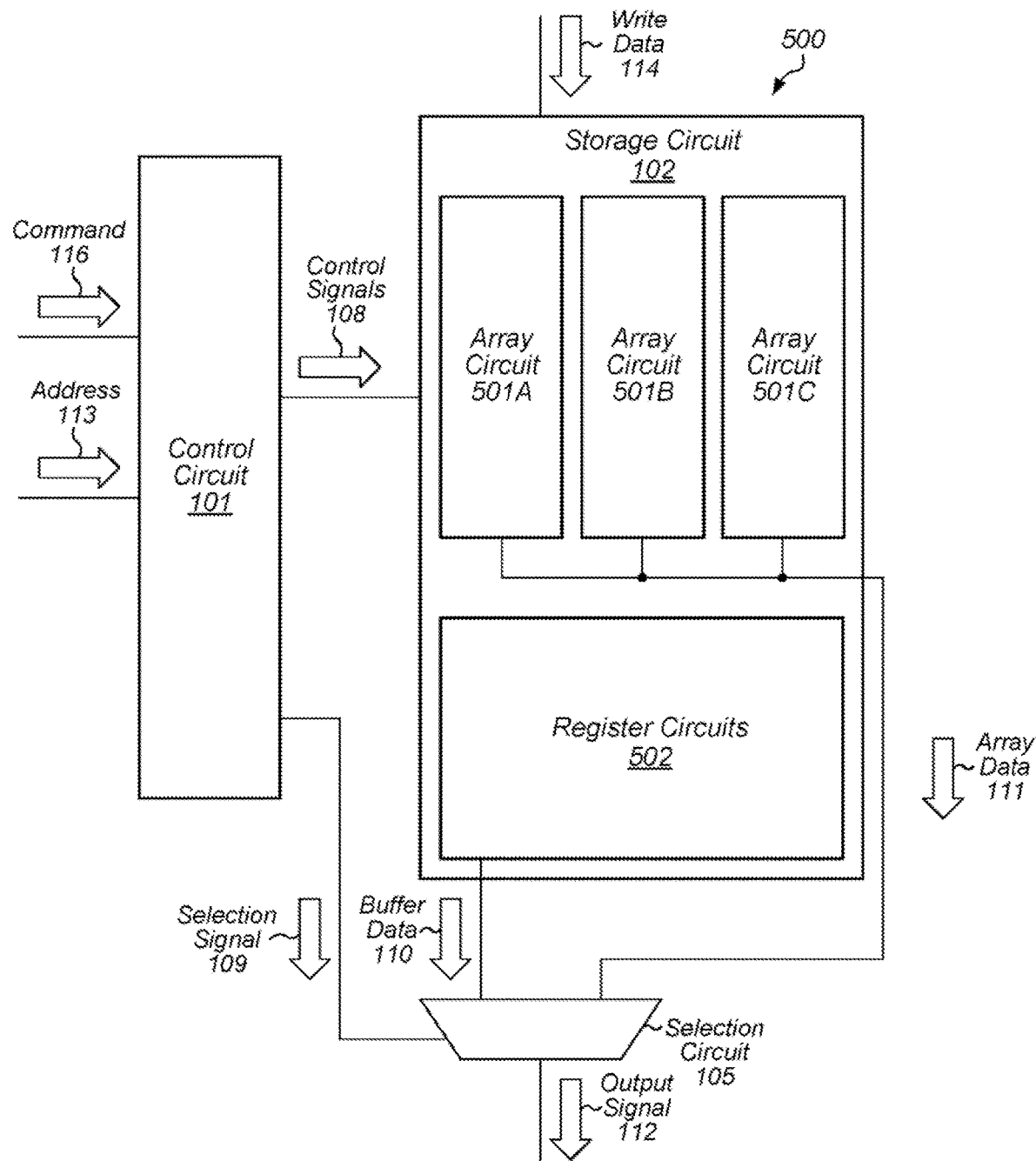
FIG. 5 is a block diagram of an embodiment of a multi-way cache memory circuit that includes register circuits.

Turning now to FIG. 5, a block diagram of a different embodiment of a memory circuit is depicted. As illustrated, memory circuit 500 may include control circuit 101, storage circuit 102, and selection circuit 105. Storage circuit 102 may include array circuits 501A-501C and register circuits 502.

Array circuits 501A-501C may each include sufficient data storage cells to store any suitable number of data words. Like array circuit 103, each of array circuits 501A-501C may be configured to store a corresponding set of data words (e.g., data words 106). In some cases, array circuits 501A-501C may correspond to different ways of a cache memory circuit. In various embodiments, different ones of array circuits 501A-501C may be activated during different cycles and may be deactivated during a given cycle in a similar fashion to that described above in regard to FIG. 1. It is noted that although only three array circuits are depicted in the embodiment of FIG. 5, in other embodiments, any suitable number of array circuits may be employed.

Register circuits 502 may be configured to store a subset of the data words from each of array circuits 501A-501C. In the embodiment illustrated in FIG. 5, a given register included in register circuits 502 may be configured to store a sufficient number of bits such that the given register may store data equivalent to a word from each of array circuits 501A-501C. It is noted that register circuits 502 may include any suitable number of register circuits such as those described above in regard to FIG. 2A.

As described above, memory circuit 500 may, in some embodiments, be used as a cache memory. By storing data that spans all of array circuits 501A-501C, register circuits 502 may include data that corresponds to multiple cache lines. In such cases, depending on spatial locality of instructions being fetched by a processor circuit, repeated sequential accesses to memory circuit 500 may retrieve data from register circuits 502 while array circuits 501A-501C are deactivated. In cases where repeated sequential accesses result in data being retrieved from register circuits 502, the power consumption associated with the accesses to memory circuit 500 may be less than implementations of memory circuits that do not employ register circuits.

Control circuit 101 and selection circuit 105 may be configured to perform in a similar fashion as described above in regard to FIG. 1. Since a portion of address 113 corresponds to which of array circuits 501A-501C is accessed, control circuit 101 may be also configured to compare that portion of address 113 to the addresses stored in register circuits 502 in order to determine if array circuits 501A-501C should be deactivated in the next cycle.

Figure 6:
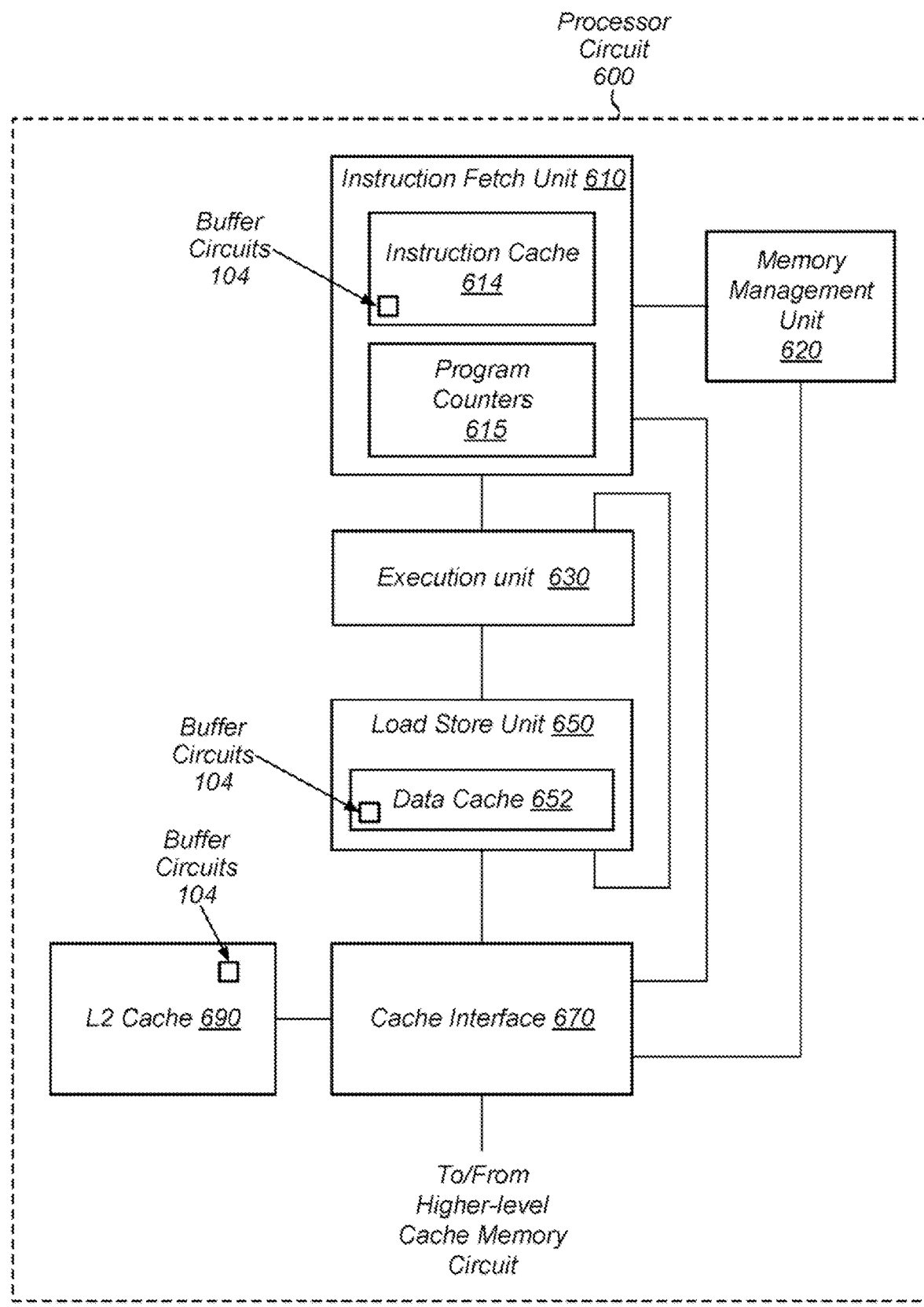
FIG. 6 is a block diagram of an embodiment of a processor circuit.

Turning to FIG. 6, a block diagram of a processor circuit is depicted. As illustrated, processor circuit 600 may include instruction fetch unit 610, memory management unit 620, execution unit 630, load store unit 650, cache interface 670, and L2 cache 690.

Instruction fetch unit 610 may be coupled to memory management unit 620 and cache interface 670. In various embodiments, instruction fetch unit 610 may be configured to perform various operations relating to the fetching of instructions from a cache or memory circuit, the selection of instructions from various threads of execution, and the decoding of such instructions prior to issuing the instructions to various functional units for execution. As illustrated, instruction fetch unit 610 may include instruction cache 614 and program counters 615. In various embodiments, instruction cache 614 may include register circuits 104 and may be implemented to operate in a similar fashion to memory circuit 100 as depicted in FIG. 1.

In some embodiments, program counters 615 may be configured to generate multiple values corresponding to addresses of instructions to be fetched for respective threads being executed by processor circuit 600. Program counters 615 may be implemented using one or more sequential logic circuits configured to generate such address values.

Memory management unit 620 may be configured to relay requests and responses from instruction fetch unit 610 and cache interface 670 to and from system memory. In various embodiments, memory management unit 620 may be further configured to perform address translation from a virtual address space used by processor circuit 600 to a physical address space used by system memory. Memory management unit 620 may, in other embodiments, be configured to translate requests from an internal format used within processor circuit 600 to a format compatible with system memory. In a similar fashion, memory management unit 620 may be further configured to translate replies from system memory into a format compatible with processor circuit 600. In various embodiments, memory management unit 620 may be implemented using a state machine or other sequential logic circuit, a microcontroller, or any other suitable logic circuit.

Execution unit 630 may be configured to execute and provide results for certain types of instructions issued from instruction fetch unit 610. In some embodiments, execution unit 630 may be configured to execute certain integer-type instructions defined in the implemented instruction set architecture. It is noted that although only a single execution unit is depicted in the embodiment of FIG. 6, in other embodiments, multiple execution units may be employed.

Load store unit 650 may be configured to process data memory references, such as integer and floating-point load and store instructions. In some embodiments, load store unit 650 may be further configured to assist in the processing of instruction cache 614 misses originating from instruction fetch unit 610. As illustrated, load store unit 650 may include data cache 652 in addition to a logic circuit configured to detect cache misses and, in response to such misses, request data from L2 cache 690 or a higher-level cache memory via cache interface 670.

In various embodiments, data cache 652 may be implemented as a write-through cache, in which all writes (or "stores") to data cache 652 may be written to a higher-level cache memory regardless of whether the stores hit in data cache 652. In some cases, writes that miss in data cache 652 may result in an allocation within data cache 652 that can be used for storing the data. Data cache 652 may, in various embodiments, include an instance of register circuits 104 and may be implemented to operate in a similar fashion to memory circuit 100.

L2 cache 690 may be configured to store (or "cache") frequently used instructions and data for use by execution unit 630. In various embodiments, L2 cache 690 may be implemented using multiple banks that can be independently accessed using corresponding addresses. Such banks may be implemented using set-associative or direct-mapped techniques. In some embodiments, L2 cache 690 may include an instance of register circuits 104 and may be implemented to operate in a similar fashion to memory circuit 100.

Cache interface 670 may be configured to relay data requests from data cache 652 and L2 cache 690 to higher-level cache memory circuits. In response to a determination that requested data is unavailable from the higher-level cache memory circuits, cache interface 670 may relay the data request to memory management unit 620 for transmission to system memory or other storage. Cache interface 670 may, in various embodiments, be implemented using a state machine or other sequential logic circuit, a microcontroller, or any other suitable logic circuit.

Figure 7:
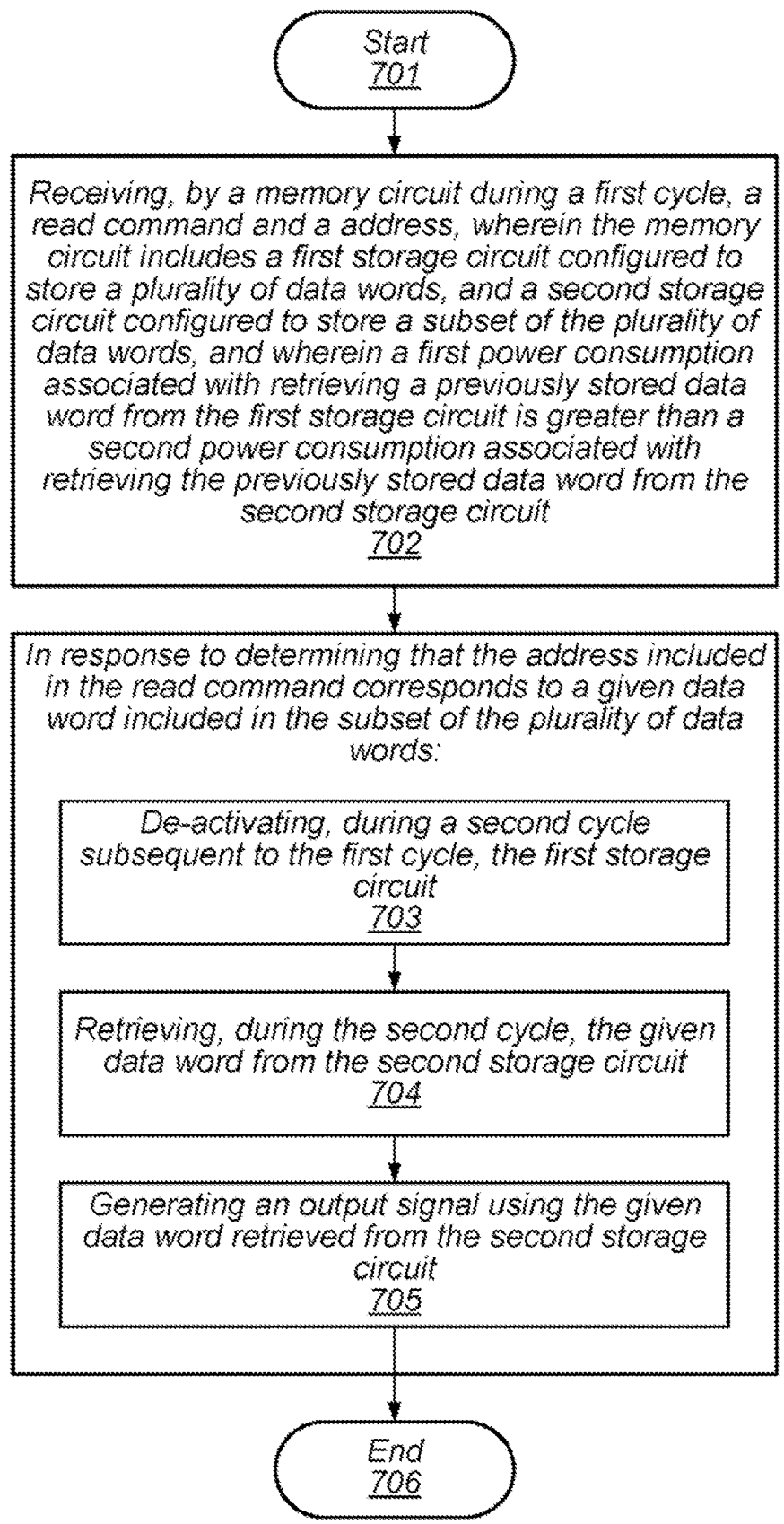
FIG. 7 is a flow diagram of an embodiment of a method for operating a memory circuit that includes register circuits.

Turning to FIG. 7, a flow diagram depicting an embodiment of operating a memory circuit that includes register circuits is illustrated. The method, which may be applied to various memory circuits, including memory circuit 100 as depicted in FIG. 1, may begin in block 701.

The method may include receiving, by a memory circuit during a first cycle, a read command and an address (block 702). In various embodiments, the memory circuit may include a first storage circuit configured to store a plurality of data words, and a second storage circuit configured to store a subset of the plurality of data words. In some embodiments, a first power consumption associated with retrieving a previously stored data word from the first storage circuit may be greater than a second power consumption associated with retrieving the previously stored data word from the second storage circuit.

In various embodiments, the first storage circuit may include a plurality of data storage cells configured to store the plurality of data words, and the second storage circuit may include a plurality of register circuits configured to store corresponding ones of the subset of the plurality of data words and associated addresses.

The method may also include, in response to determining that the address corresponds to a given data word included in the subset of the plurality of data words, de-activating the first storage circuit during a second cycle subsequent to the first cycle (block 703). In some embodiments, de-activating the first storage circuit may include halting a clock signal used by the first storage circuit.

The method may further include, also in response to determining that the address corresponds to the given data word, retrieving, during the second cycle, the given data word from the second storage circuit (block 704). In various embodiments, retrieving the given data word may include comparing the address to a plurality of addresses associated with the subset of the plurality of data words stored in the corresponding ones of the plurality of registers circuits, and in response to determining the address matches a particular address of the plurality of addresses, selecting a particular register circuit of the plurality of register circuits that stores the particular address.

The method may also include, in response to determining that the address corresponds to the given data word, generating an output signal using the given data word retrieved from the second storage circuit (block 705). In various embodiments, generating the output signal may include using an output of the particular register circuit of the plurality of register circuits.

The method may concludes in block 706. It is noted that the embodiment of the method depicted in the flow diagram of FIG. 7 may, in other embodiments, be used in combination with the methods depicted in the flow diagrams of FIGS. 8 and 9 as described below.

Figure 8:
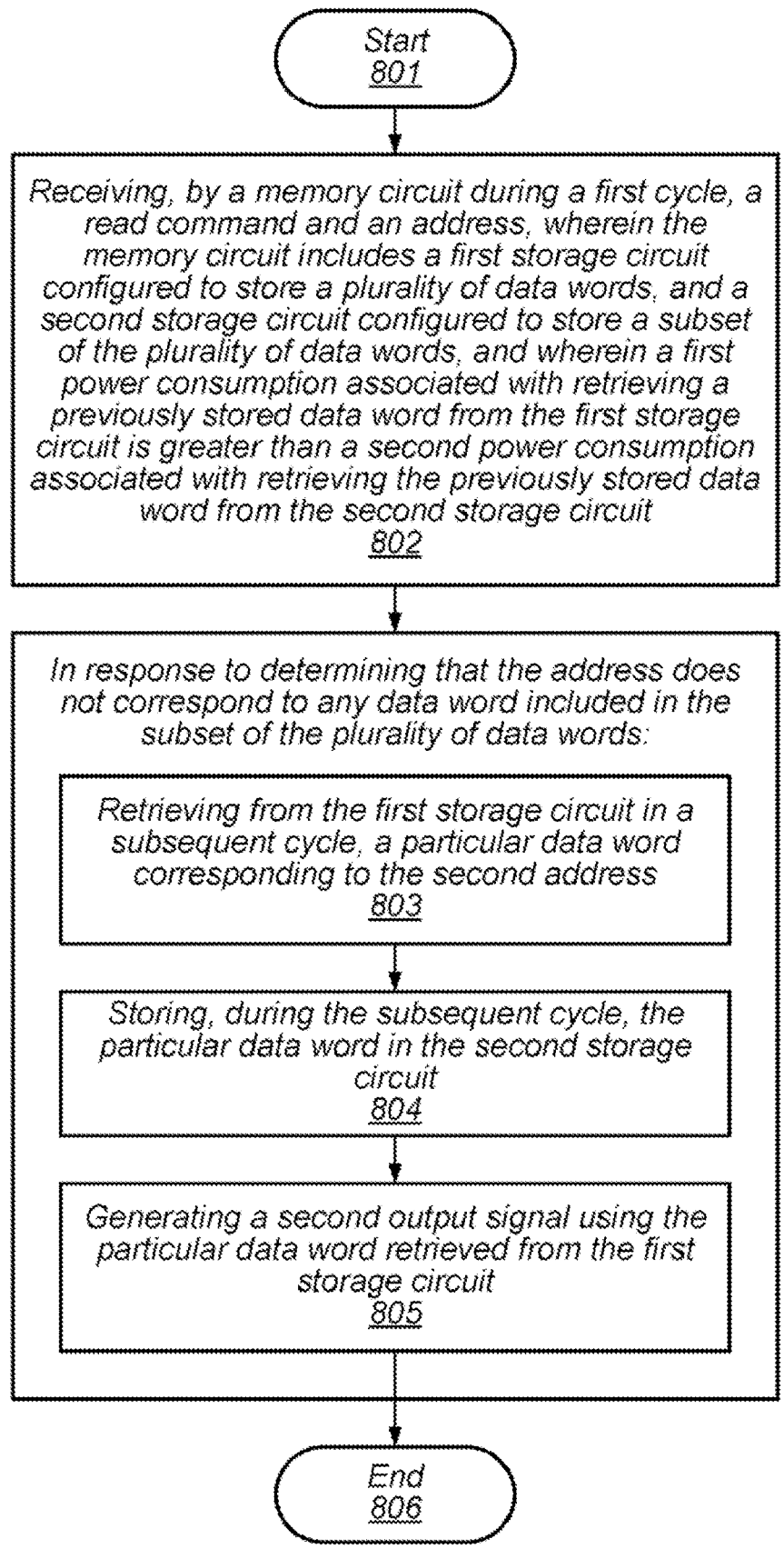
FIG. 8 is a flow diagram of an embodiment of a method for allocating data into register circuits included in a memory circuit.

In some cases, when a read command and address are received by the memory circuit described above in regard to FIG. 7 that do not correspond to any of the data stored in the second storage circuit, the opportunity may be used to allocate a space in the second storage circuit for the newly requested data. A flow diagram depicting an embodiment of a method for allocating an entry in the second storage circuit of a memory circuit is illustrated in FIG. 8. The method, which may be applied to various memory circuits including memory circuit 100, may begin in block 801.

The method may include receiving, by a memory circuit during a first cycle, a read command and an address (block 802). In various embodiments, the memory circuit may include a first storage circuit configured to store a plurality of data words, and a second storage circuit configured to store a subset of the plurality of data words. In some embodiments, a first power consumption associated with retrieving a previously stored data word from the first storage circuit may be greater than a second power consumption associated with retrieving the previously stored data word from the second storage circuit.

The method may also include, in response to determining that the address does not correspond to any data word included in the subset of the plurality of data words, retrieving from the first storage circuit, during a second cycle subsequent to the first cycle, a particular data word corresponding to the address (block 803). In various embodiments, the first storage circuit may include a plurality of data storage cells configured to store the plurality of data words, and the second storage circuit may include a plurality of register circuits configured to store corresponding ones of the subset of the plurality of data words and associated addresses.

The method may further include, in response to determining that the address does not correspond to any data words included in the subset of the plurality of data words, storing the particular data word in the second storage circuit (block 804). In various embodiments, storing the particular data word may include selecting, using a write pointer, a particular register circuit of the plurality of register circuits, and storing the particular data word into a portion of the particular register circuit. The method may further include, in some embodiments, storing the address into a second portion of the particular register circuit, and storing a valid value into a third portion of the particular register circuit.

In various embodiments, the method may also include updating a value of the write pointer. In some cases, updating the value of the write pointer may include changing the value of the write pointer using a round robin algorithm. Alternatively, updating the value of the write pointer may include changing the value of the write point using a least-recently-used algorithm.

The method may also include, in response to determining that the address does not correspond to any data words included in the subset of the plurality of data words, generating an output signal using the particular data word retrieved from the first storage circuit (block 805).

The method may conclude in block 806. It is noted that the embodiment of the method depicted in the flow diagram of FIG. 8 may, in various embodiments, be combined with the methods depicted in the flow diagrams of FIGS. 7 and 9.

Figure 9:
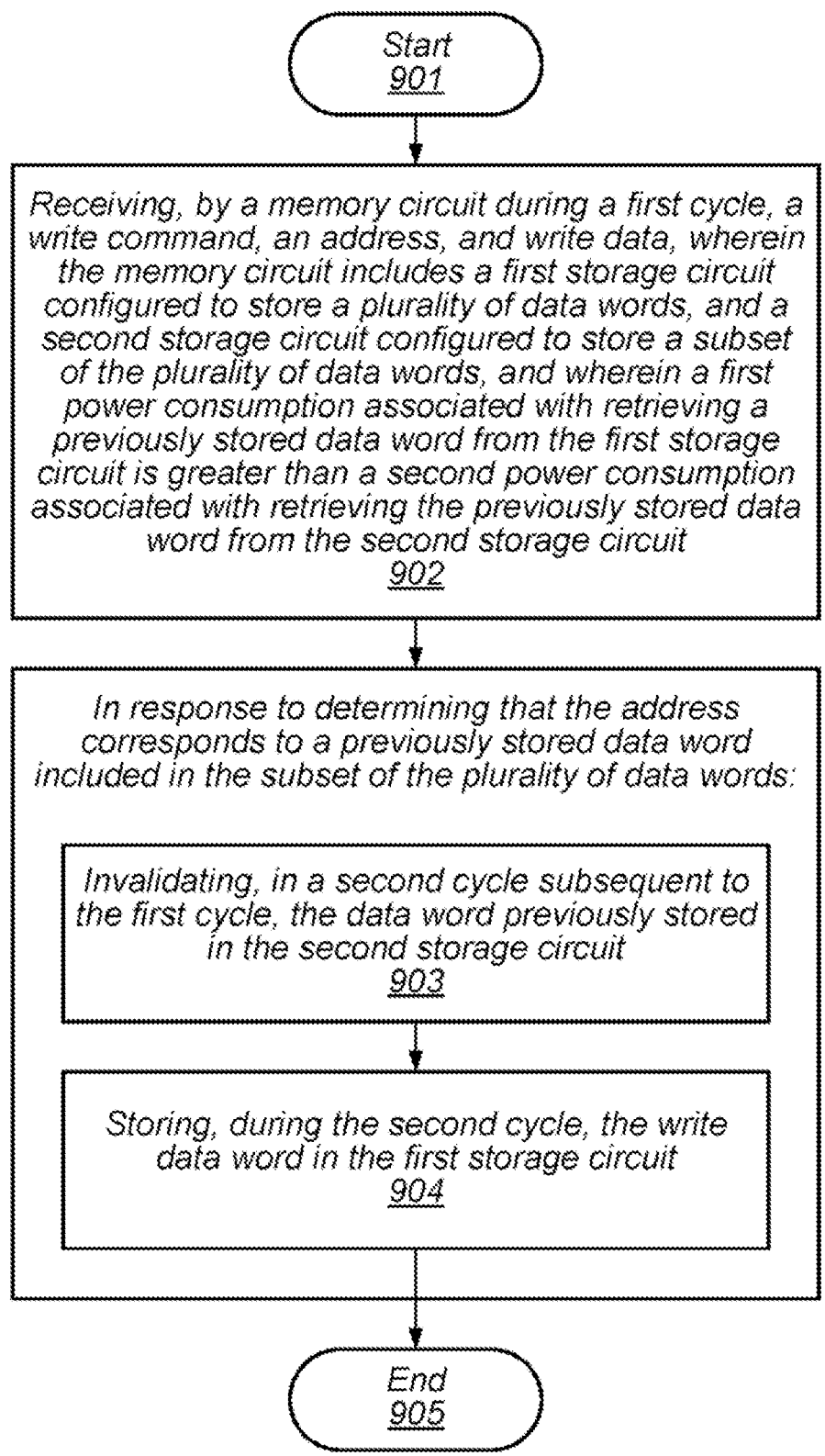
FIG. 9 is a flow diagram of an embodiment of a method for storing data in a memory circuit that includes register circuits.

Turning to FIG. 9, a flow diagram depicting an embodiment of storing data in a memory circuit is illustrated. The method, which may be applied to various memory circuits including memory circuit 100, may begin in block 901.

The method may include receiving, by a memory circuit during a first cycle, a write command, an address, and write data (block 902). In various embodiments, the memory circuit may include a first storage circuit configured to store a plurality of data words, and a second storage circuit configured to store a subset of the plurality of data words. In some embodiments, a first power consumption associated with retrieving a previously stored data word from the first storage circuit may be greater than a second power consumption associated with retrieving the previously stored data word from the second storage circuit.

In various embodiments, the first storage circuit may include a plurality of data storage cells configured to store the plurality of data words, and the second storage circuit includes a plurality of register circuits configured to store corresponding ones of the subset of the plurality of data words and associated addresses.

The method may further include, in response to determining that the address corresponds to a previously stored data word included in the subset of the plurality of data words, invalidating, in a second cycle subsequent to the first cycle, the previously stored data word in the second storage circuit (block 903). In various embodiments, invalidating the previously stored data word may include selecting a particular register circuit of the plurality of register circuits where the previously stored data is located, and storing an invalid value into a portion of the particular register circuit.

The method may also include storing, during the second cycle, the write data word into the first storage circuit (block 904). In various embodiments, storing the write data word into the first storage circuit may include decoding the address, activating a particular word line coupled to a subset of the plurality of data storage cells, and storing bits included in the write data word into corresponding ones of the activated subset of the plurality of data storage cells.

The method may concludes in block 905. It is noted that the embodiment of the method depicted in the flow diagram may, in various embodiments, be used in combination with the methods depicted in the flow diagrams of FIGS. 7 and 8.

Figure 10:
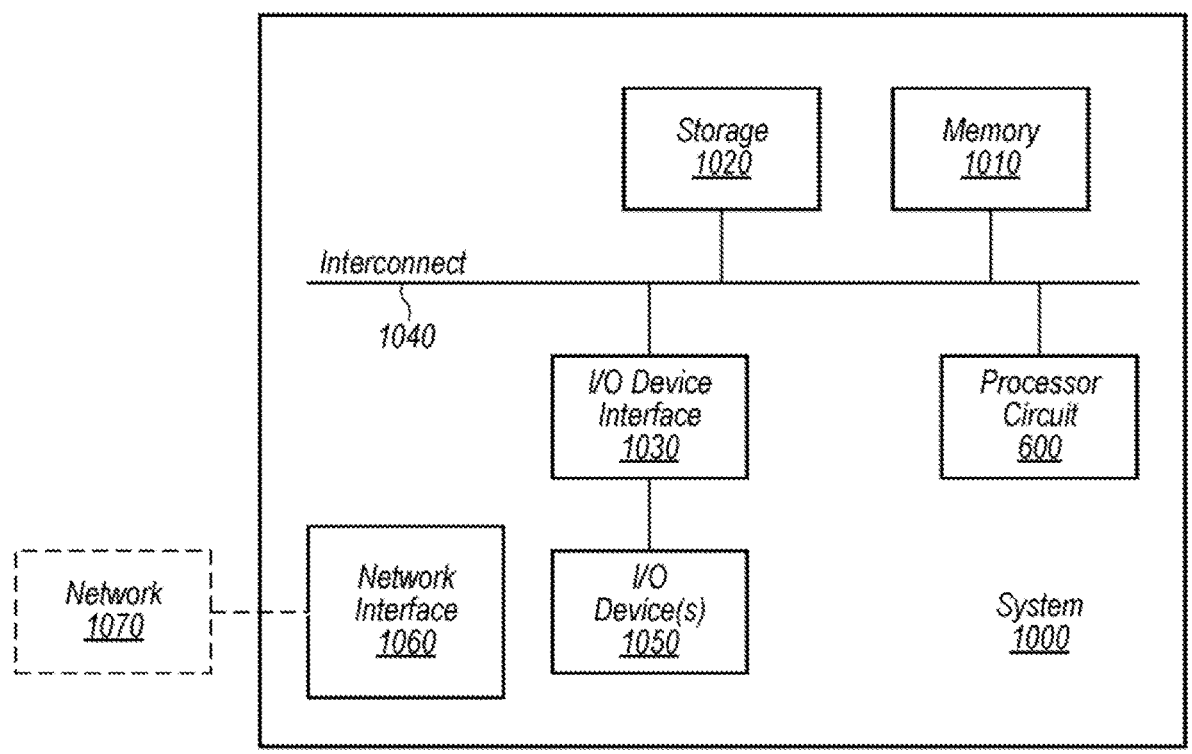
FIG. 10 is a block diagram of one embodiment of a computing device including a processor that includes cache memory circuits that include register circuits.

Processor circuit 600, described above with reference to FIG. 6, may be included within a variety of system configurations, one example of which is shown in FIG. 10. In various embodiments, system 1000 may correspond to a general-purpose computer system, such as a desktop or portable computer, a mobile phone, or the like. System 1000 may also correspond to any type of embedded system that may employ one or more instances of processor circuit 600 as a dedicated controller. For example, system 1000 may correspond to any type of computer peripheral device such as a mass storage device or storage array, printer, or the like, as well as control systems for automobiles, aviation, manufacturing, and other suitable applications.

As shown, system 1000 may include processor circuit 600, memory 1010, storage 1020, and an input/output (I/O) device interface 1030 coupled via an interconnect 1040. One or more I/O devices 1050 may be coupled via I/O device interface 1030. System 1000 may also include a network interface 1060 that may be configured to couple system 1000 to a network 1070 for communications with, e.g., other systems. (In various embodiments, network interface 1060 may be coupled to interconnect 1040 directly, via I/O device interface 1030, or according to a different configuration.) It is noted that some or all of the components of system 1000 may be fabricated as a system-on-a-chip, although discrete combinations of components may also be employed.

Processor circuit 600 may include a cache memory circuit as disclosed above. Memory 1010 may include random-access memory (RAM) of any suitable configuration, such as working memory configured to store data and instructions usable by processor circuit 600. Storage 1020 may include mass storage devices such as magnetic, optical, or nonvolatile/flash memory storage, or a combination of these. In some embodiments, either of memory 1010 or storage 1020 may be omitted or integrated into the other as a single memory subsystem from the perspective of processor circuit 600.

I/O device interface 1030 may be configured to interface between interconnect 1040 and one or more other types of buses or interfaces. For example, interconnect 1040 may correspond to the advanced high-bandwidth bus ("AHB") interface or another suitable type of high-bandwidth interconnect, and I/O device interface 1030 may be configured as a bridge device that enables coupling of different types of I/O devices to interconnect 1040. I/O device interface 1030 may implement one or more interface protocols such as Universal Serial Bus, Firewire, or other suitable standards. I/O device(s) 1050 may include any suitable type of storage, network interface, user interface, graphics processing, or other type of device. Network 1070, if present, may be any suitable type of wired or wireless communications network, such as an Internet Protocol (IP) addressed local or wide-area network, a telecommunications network, or the like. Network interface 1060, if present, may be configured to implement any suitable network interface protocol needed for communication with network 1070.

Figure 11:
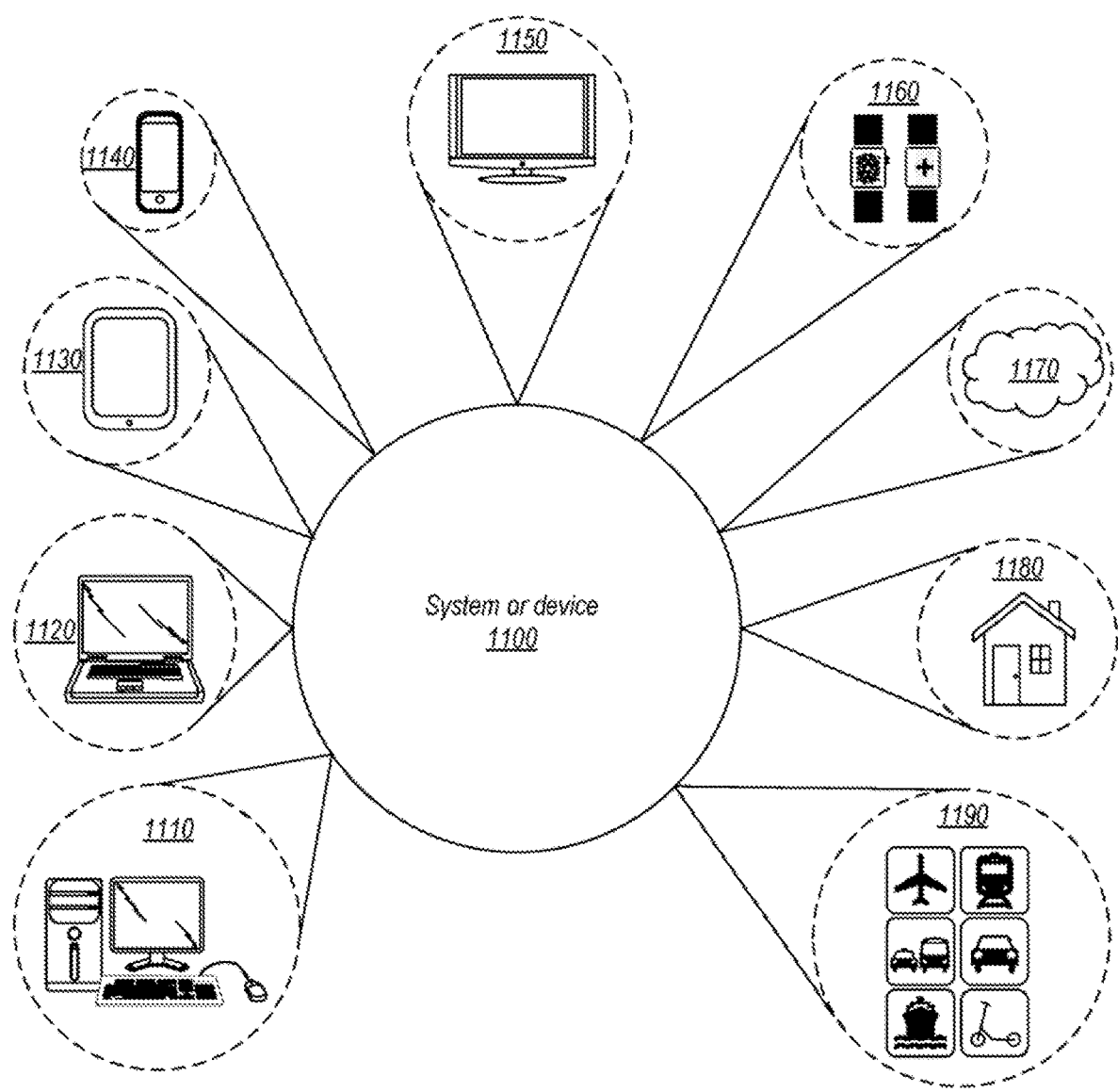
FIG. 11 is a block diagram of an embodiment of a system.

Turning now to FIG. 11, various types of systems that may include any of the circuits, devices, or systems discussed above are illustrated. System or device 1100, which may incorporate or otherwise utilize one or more of the techniques described herein, may be utilized in a wide range of areas. For example, system or device 1100 may be utilized as part of the hardware of systems such as a desktop computer 1110, laptop computer 1120, tablet computer 1130, cellular or mobile phone 1140, or television 1150 (or set-top box coupled to a television).

Similarly, disclosed elements may be utilized in a wearable device 1160, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions such as monitoring a user's vital signs, performing epidemiological functions such as contact tracing, providing communication to an emergency medical service, etc. Other types of devices are also contemplated, including devices worn on the neck, devices implantable in the human body, glasses, or a helmet designed to provide computer-generated reality experiences such as those based on augmented and/or virtual reality, etc.

System or device 1100 may also be used in various other contexts. For example, system or device 1100 may be utilized in the context of a server computer system, such as a dedicated server or on shared hardware that implements a cloud-based service 1170. Still further, system or device 1100 may be implemented in a wide range of specialized everyday devices, including devices 1180 commonly found in the home such as refrigerators, thermostats, security cameras, etc. The interconnection of such devices may often be referred to as the "Internet of Things" (IoT). Elements may also be implemented in various modes of transportation. For example, system or device 1100 could be employed in the control systems, guidance systems, entertainment systems, etc. of various types of vehicles 1190.

The applications illustrated in FIG. 11 are merely exemplary and are not intended to limit the potential future applications of disclosed systems or devices. Other example applications include, without limitation: portable gaming devices, music players, data storage devices, unmanned aerial vehicles, etc.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure. References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit, and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112 (f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements are defined by the functions or operations that they are configured to implement. The arrangement of such circuits/units/components with respect to each other and the manner in which they interact, form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements that may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in a scenario in which the circuit or logic designer never specifies a particular set of structures for the low-level implementation beyond a description of what the circuit is configured to do, as this process is performed at a different stage of the circuit implementation process.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   a storage circuit including an array circuit configured to store a plurality of data words, and a plurality of register circuits configured to store a subset of the plurality of data words; and
   a control circuit configured to:
     receive, during a first processing cycle, a first read command and a first address;
     compare the first address to a plurality of addresses associated with the subset of the plurality of data words stored in corresponding ones of the plurality of register circuits;
     in response to a determination that the first address matches a particular address of the plurality of addresses, select a particular register circuit of the plurality of register circuits that stores the particular address;
     in response to a determination that the first address corresponds to a given data word included in the subset of the plurality of data words, de-activate the array circuit in a second processing cycle subsequent to the first processing cycle; and
   a selection circuit configured to generate an output signal by selecting data retrieved from the particular register circuit of the plurality of register circuits in which the given data word is stored using a plurality of selection signals generated by the control circuit,
   wherein to de-activate the array circuit in the second processing cycle, the control circuit is further configured to activate at least one selection signal of the plurality of selection signals configured to retrieve desired data from the particular register circuit of the plurality of register circuits while deactivating the array circuit.

2. The apparatus of claim 1, wherein the control circuit is further configured to:
   receive, during a third processing cycle, a second read command and a second address; and
   in response to a determination that the second address does not correspond to any data words included in the subset of the plurality of data words:
     retrieve, during a fourth processing cycle subsequent to the third processing cycle, a particular data word corresponding to the second address from the array circuit;
     store, during the fourth processing cycle, the particular data word in a given register circuit of the plurality of register circuits; and generate, during the fourth processing cycle, a second output signal using the particular data word retrieved from the array circuit.

3. The apparatus of claim 2, wherein to store, during the fourth processing cycle, the particular data word in a given register circuit, the control circuit is further configured to:
select, using a write pointer, the given register circuit of the plurality of register circuits, wherein the given register circuit includes a plurality of storage circuits;
store the particular data word in a first portion of the register circuit;
store the second address in a second portion of the register circuit;
store a valid value into a third position of the particular register circuit; and
update a value of the write pointer.

4. The apparatus of claim 1, wherein the control circuit is further configured to:
receive a write command, a second address, and write data during a third processing cycle;
in response to a determination that the address corresponds to a previously stored data word included in the subset of the plurality of data words:
invalidate, in a fourth processing cycle subsequent to the third processing cycle, the previously stored data word in the plurality of register circuits; and
store, during the fourth processing cycle, the write data in the array circuit.

5. The apparatus of claim 1, wherein to de-activate the array circuit in the second processing cycle, the control circuit is further configured to halt a clock signal used by the array circuit.

6. A method, comprising:
receiving, by a memory circuit during a first processing cycle, a read command and an address, wherein the memory circuit includes a first storage circuit configured to store a plurality of data words, and a second storage circuit configured to store a subset of the plurality of data words, wherein the second storage circuit includes a plurality of register circuits configured to store corresponding ones of the subset of the plurality of data words and associated addresses, and wherein a first power consumption associated with retrieving a previously stored data word from the first storage circuit is greater than a second power consumption associated with retrieving the previously stored data from the second storage circuit;
comparing the address to a plurality of addresses associated with the subset of the plurality of data words stored in corresponding ones of the plurality of register circuits;
in response to determining that the address matches a particular address of the plurality of addresses, selecting a particular register circuit of the plurality of register circuits that stores the particular address; and
in response to determining that the address included in the read command corresponds to a given data word included in the subset of the plurality of data words:
de-activating the first storage circuit in a second processing cycle subsequent to the first processing cycle;
retrieving, during the second cycle, the given data word from the second storage circuit; and
generating an output signal using the given data word retrieved from the particular register circuit of the plurality of register circuits of the second storage circuit using a plurality of selection signals,
wherein de-activating the first storage circuit in the second processing cycle includes activating at least one selection signal of the plurality of selection signals configured to retrieve desired data from the particular register circuit of the plurality of register circuits while deactivating the first storage circuit.

7. The method of claim 6, wherein the first storage circuit includes a plurality of data storage cells configured to store the plurality of data words, and wherein de-activating the first storage circuit in the second processing cycle includes halting a clock signal used by the first storage circuit.

8. The method of claim 6, further comprising:
receiving, during a third processing cycle, a second read command and a second address; and
in response to determining that the second address does not correspond to any data words included in the subset of the plurality of data words:
retrieving, during a fourth processing cycle subsequent to the third processing cycle, a particular data word corresponding to the second address from the first storage circuit;
storing, during the fourth processing cycle, the particular data word in the second storage circuit; and
generating a second output signal using the particular data word retrieved from the first storage circuit.

9. The method of claim 8, wherein storing, during the fourth processing cycle, the particular data word includes:
selecting, using a write pointer, a particular register circuit of the plurality of register circuits;
storing the particular data word into a portion of the particular register circuit;
storing the second address into a second portion of the particular register circuit;
storing a valid value into a third portion of the particular register circuit; and
updating a value of the write pointer.

10. The method of claim 6, further comprising:
receiving a write command, a second address, and write data during a third processing cycle;
in response to determining that the second address corresponds to a previously stored word included in the subset of the plurality of data words:
invalidating, in a fourth processing cycle subsequent to the third processing cycle, the previously stored data word in the second storage circuit; and
storing, during the fourth processing cycle, the write data in the first storage circuit.

11. An apparatus, comprising:
a processor circuit; and
a cache memory circuit that includes a first storage circuit configured to store a plurality of data words, and a second storage circuit configured to store a subset of the plurality of data words, wherein a first power consumption associated with retrieving a previously stored data word from the first storage circuit is greater than a second power consumption associated with retrieving the previously stored data from the second storage circuit, wherein the second storage circuit includes a plurality of register circuits configured to store corresponding ones of the subset of the plurality of data words and associated addresses, and wherein the cache memory circuit is configured to:
receive, from the processor circuit during a first processing cycle, a first read command and a first address;

compare the first address to a plurality of addresses associated with the subset of the plurality of data words stored in corresponding ones of the plurality of register circuits;

in response to a determination that the first address matches a particular address of the plurality of addresses, select a particular register circuit of the plurality of register circuits that stores the particular address; and in response to a determination that the first address corresponds to a given data word included in the subset of the plurality of data words:

de-activate the first storage circuit in a second processing cycle subsequent to the first processing cycle;

retrieve, during the second processing cycle, the given data word from the second storage circuit; and generate an output signal using the given data word retrieved from the particular register circuit of the plurality of register circuits of the second storage circuit using a plurality of selection signals, wherein to de-activate the first storage circuit in the second processing cycle, the cache memory circuit is further configured to activate at least one selection signal of the plurality of selection signals configured to retrieve desired data from the particular register circuit of the plurality of register circuits while deactivating the first storage circuit.

12. The apparatus of claim 11, wherein the first storage circuit includes a plurality of data storage cells configured to store the plurality of data words, and wherein to de-activate the first storage circuit in the second processing cycle, the cache memory circuit is further configured to halt a clock signal used by the first storage circuit.

13. The apparatus of claim 11, wherein the cache memory circuit is further configured to:

receive, during a third processing cycle, a second read command and a second address; and in response to a determination that the second address does not correspond to any data words included in the subset of the plurality of data words:

retrieve, during a fourth processing cycle subsequent to the third processing cycle, a particular data word corresponding to the second address from the first storage circuit;

store, during the fourth processing cycle, the particular data word in the second storage circuit; and generate a second output signal using the particular data word retrieved from the first storage circuit.

14. The apparatus of claim 13, wherein to store the particular data word, the cache memory circuit is further configured to:

select, using a write pointer, a particular register circuit of the plurality of register circuits;

store the particular data word into a portion of the particular register circuit;

store the second address into a second portion of the particular register circuit;

store a valid value into a third portion of the particular register circuit; and update a value of the write pointer.

15. The apparatus of claim 11, wherein the cache memory circuit is further configured to:

receive a write command, a second address, and write data during a third processing cycle; and in response to a determination that the address corresponds to a previously stored word included in the subset of the plurality of data words:

invalidate, in a fourth processing cycle subsequent to the third processing cycle, the previously stored data word in the second storage circuit; and store, during the fourth processing cycle, the write data in the first storage circuit.

* * * * *